United States Patent [19]

Kreahling et al.

[11] 4,052,500
[45] Oct. 4, 1977

[54] DRAWING ISOCYANATE-TREATED POLYESTER FILAMENTS

[75] Inventors: Robert P. Kreahling, Fairfield; Donald J. Casey, Ridgefield, both of Conn.; David Z. Goldenberg, Mentor, Ohio

[73] Assignee: American Cyanamid Company, Stamford, Conn.

[21] Appl. No.: 281,247

[22] Filed: Aug. 16, 1972

[51] Int. Cl.² .............................................. D01D 5/12
[52] U.S. Cl. .............................. 264/290 T; 264/137; 427/171
[58] Field of Search .................... 117/7, 137, 138.8 F, 117/135.5, 47 A, 47 R, 139.5 CQ, DIG. 7, 66, 76 T, 161 ZA; 264/210 Z, 176 F, 211, 137; 260/75 T; 8/115.5; 57/164; 152/359; 161/5; 156/229, 330, 315; 427/171

[56] References Cited

U.S. PATENT DOCUMENTS

| | | | |
|---|---|---|---|
| 2,994,671 | 8/1961 | Thompson | 117/7 |
| 3,196,035 | 7/1965 | Yanagihara et al. | 117/47 A |
| 3,234,067 | 2/1966 | Krysiak | 117/7 |
| 3,297,467 | 1/1967 | Macura et al. | 117/138.8 F |
| 3,297,468 | 1/1967 | Macura et al. | 117/138.8 F |
| 3,329,758 | 7/1967 | Morgan et al. | 264/211 |
| 3,335,209 | 8/1967 | Morgan et al. | 264/211 |
| 3,383,242 | 5/1968 | Macura et al. | 117/138.8 F |
| 3,549,740 | 12/1970 | Schwarz | 264/137 |
| 3,561,937 | 2/1971 | Matthews | 264/178 F |
| 3,703,426 | 11/1972 | Larson et al. | 117/47 R |
| 3,755,165 | 8/1973 | Bhakuni et al. | 117/138.8 F |

*Primary Examiner* — Jay H. Woo
*Attorney, Agent, or Firm* — Philip Mintz

[57] ABSTRACT

Polyester filaments of improved drawability and improved adhesion to rubber are prepared by applying to polyester filaments coated with aromatic isocyanate containing at least two isocyanate groups per molecule 0.02 to 0.4% on weight of fiber of a hydroxy-containing finish less than 1 hour prior to drawing such filaments to 4 to 7 times their undrawn length.

4 Claims, No Drawings

DRAWING ISOCYANATE-TREATED POLYESTER FILAMENTS

This invention relates to polyester reinforcement for rubber articles, such as tires, belts, hose, and the like. More particularly, it relates to a treatment for polyester fibers to improve the adhesion thereof to the rubber article in which they are to be used as reinforcement.

Prior to the present invention, it was known to apply aromatic isocyanate containing at least two isocyanate groups per molecule to polyester fibers prior to embedding such fibers, in the form of yarn, cord, or fabric, in rubber to improve the adhesion of the polyester to the rubber. Frequently, such isocyanate-treated polyester fibers are additionally treated with an RFL dip prior to embedding in rubber to further improve the adhesion.

In the preparation of such isocyanate-treated polyester fibers, it has been found that improved adhesion can be achieved when the isocyanate is applied to the polyester fibers prior to drawing the fibers in steam, as taught by Schwarz U.S. Pat. No. 3,549,740 issued Dec. 22, 1970. While steam-drawing is a known technique for orienting synthetic fibers, generally it is preferred, when possible, to use dry heat and to orient the synthetic fibers by drawing them in contact with heated surfaces, such as heated rolls, heated platens, heated draw pins, etc. Unfortunately, as pointed out in said Schwarz patent, dry heat drawing is not suitable for his process, steam-drawing is essential. In seeking to utilize the generally preferable dry heat drawing process, we have discovered that high adhesive strengths can be achieved provided (a) a critical concentration of between 0.02 and 0.4% on weight of fiber of hydroxy-containing lubricating finish is applied to the polyester fibers subsequent to the isocyanate treatment and prior to drawing and (b) such finish is applied less than one hour prior to drawing the polyester fibers.

It is well known to use filaments of synthetic linear condensation polyester as reinforcement for rubber articles. The term "synthetic linear condensation polyester" refers to a linear polymer comprised of recurring structural units containing, as an integral part of the polymer chain, recurring carbonyloxy groups

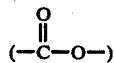

and having a relative viscosity of at least about 25 in a solution of 11 g. of polymer in 100 ml. of a mixed solvent composed of 10 parts by weight of phenol and 7 parts by weight of trichlorophenol. Preferably, the polyester is one of the polymethylene terephthalates described in U.S. Pat. Nos. 2,465,319; 3,051,212; and 3,216,187. Polyethylene terephthalate is the especially preferred commercial polyester at present.

In the process of manufacturing filaments of polyester for use as reinforcement for rubber articles, it is usual to include at some point in the process, at least one drawing step wherein the filaments are stretched or elongated to orient the molecules therein thereby increasing the strength of such filaments. Preferably, such drawing step or steps serve to elongate the filaments to about 4 to 7 times their undrawn length. Numerous means are known for accomplishing such drawing step or steps which can be used in conjunction with the present invention, although it is generally preferred to utilize those means wherein the filaments are heated in air in contact with a heated surface such as heated rolls, heated platens, heated draw pins, etc. which may be heated internally (as by internal electric heaters) or externally (as by radiant heaters) or combinations thereof.

In order to enhance the adhesion of synthetic filaments of rayon or nylon to rubber, it is known to either apply a resorcinol-formaldelhyde-latex dip (commonly termed an RFL dip) to such filaments prior to embedding them in the rubber or to use certain rubber adhesion-promoting additives, such as a combination of a formaldehyde-donor (e.g. trimethylolnitromethane, trimethylolacetoaldehyde, hexamethylenetetramine, paraformaldehyde, or hexamethoxymethylmelamine) and a polyhydroxyphenol (e.g. resorcinol or phloroglucinol) with or without hydrated silica. In contrast to the results with rayon or nylon, these techniques do not result in any substantial adhesion enhancement when applied to polyester filaments. However, it is known that enhanced adhesion to rubber can be achieved with these techniques provided the polyester filaments have been treated with certain adhesion promoters, such as polyepoxides, isocyanates, ethyleneureas, etc. The present invention is an improvement on this technology when aromatic isocyanates are used as the pretreatment to enhance the adhesion of polyester filaments to rubber whether or not an RFL dip or rubber adhesion-promoting additives are used.

It had been found that superior results were achieved when the polyester filaments were treated with the aromatic isocyanate prior to drawing and then drawing in the presence of steam (steam-drawing) to react the isocyanate with water on the nascent polyester filament surface during drawing as disclosed in Schwarz U.S. Pat. No. 3,549,740. However, as pointed out in Schwarz, dry heat drawing (wherein the filaments are heated in air in contact with a heated surface in the absence of steam) is unsuitable. The present invention has for its object a modification of this process to permit use of dry heat drawing.

In accordance with the present invention, we have found that dry heat drawing can be utilized provided (a) a critical concentration of between 0.02 and 0.4% on weight of fiber of a hydroxy-containing lubricating finish is applied to the polyester filaments subsequent to the isocyanate treatment and prior to drawing and (b) such finish is applied less than one hour prior to drawing the polyester filaments.

The isocyanate compounds useful for the process of this invention are those aromatic isocyanates containing at least two isocyanates groups per molecule, such as polymethylene polyphenyl isocyanate or PAPI; methylene-bis(4-phenylisocyanate) or MDI; toluene diisocyanate or TDI; toluene triisocyanate; triphenylmethane triisocyanate; MDI-dimert; TDI-dimer; TDI-trimer; ethylene-bis(N-3-isocyanato-4-methylphenylurethane); phenylene diisocyanate; naphthalene diisocyanate; 3,3'-dimethyl or dimethoxy-4,4'-bisphenylene diisocyanate; 4,4'-bis(2-methyl or methoxy-isocyanatophenyl)methane; chlorobenzene diisocyanate; nitrobenzene diisocyanate; xylylene diisocyanate; dichloro-biphenylene diisocyanate; etc., and various mixtures thereof. The aromatic isocyanate is preferably applied to the polyester filaments as a concentrated solution in an inert solvent such as a hydrocarbon, an ether, a ketone, an ester, or a chlorinated hydrocarbon, illustrative of which are toluene, xylene, bis-(2-methoxyethyl)ether, 3-pentanone, methyl ethyl ketone, ethyl acetate, chlorobenzene, dichloroethylene, trichloroethylene, tetrachloroethane, and perchloroethylene. Usually, the amount of aromatic isocyanate applied to the polyester filaments results in a coating of 0.05 to 5% on weight of fiber.

The hydroxy-containing finishes useful for the process of this invention includes fatty acid esters of polyhydric alcohols, such as glycerol monostearate, sorbitol monolaurate, sorbitol monostearate, and sorbitol monoleate, ethoxylated sorbitol esters, ethoxylated alkylamines, ethoxylated glycerides, ethoxylated long chain alkylphenols, polyoxyethylene monolaurate, and ethylene oxide-alcohol condensates although other hydroxy-containing finishes can also be used. The finishes may also contain other ingredients, such as lubricants, dyes, etc, for other purposes as is not uncommon in finish compositions. The finish is preferably applied as a 5 to 20% solution. Suitable solvents include water, stoddard solvent, kerosene, ethyl alcohol, isopropyl alcohol, acetone, mixtures of acetone or alcohol and water, etc. Critically, the amount of hydroxy-containing finish applied to the isocyanate-treated polyester filaments results in a coating of 0.02 to 0.4% on weight of fiber. With too little of such finish, the filaments cannot be dry heat drawn at the speeds needed for commercial production due to excessive breakage of filaments. With too much finish, there is a marked drop in adhesion of the polyester filaments to the rubber (a phenomenon which will become apparent from the examples to follow).

It is also important that the isocyanate-treated polyester filaments be drawn or stretched promptly after application of the hydroxy-containing finish to minimize loss in adhesion to the rubber. Preferably, the time which elapses between application of the finish until the filaments are drawn should be less than about a minute, although time lapses of up to one hour can be tolerated.

The invention will be more fully understood by reference to the following examples which are intended to be illustrative and not limitative. All parts and percentages are on a weight basis except where expressly noted.

In these examples, the adhesive strength was measured by the "Ring Peel Adhesion" test as follows. The drawn polyester filaments, in the form of a cord, were dipped in an RFL dip prepared by mixing together 16.6 parts of resorcinol, 14.7 parts of 37% formaldehyde, 1.3 parts of sodium hydroxide, and 332.4 parts of water, aging for two hours, then adding 195 parts of a 41% vinylpyridine latex and 50 parts of a styrene-butadiene latex, and aging for an additional 24 hours. The cord, after dipping, had a dip pick-up between 4% and 6% on weight of fiber. After application to the cord, the RFL dip was cured at 400° F. for 90 seconds. The cord was then wrapped in three layers around a 1.625-inch diameter mandrel covered with heavy duty aluminum foil painted with rubber cement. The cords in each layer lying side-by-side as close together as possible without overlap. A thin sheet of rubber stock was wrapped around the cord-wrapped mandrel and a covering was applied over the rubber stock to stabilize it during curing and to strengthen it for testing. Next, the mandrel was placed in an autoclave to cure the rubber at elevated temperature. After curing the rubber, and allowing the mandrel to cool to room temperature, the cured rubber sleeve containing the test cords is cut into one-inch wide rings which are then removed from the mandrel and placed on an undersized mandrel where they are slit axially through the rubber down to the cord layers but not deep enough to nick or damage the cords. The thus prepared "ring" is placed on a free-turning support in an Instron Tester and the loose end of the rubber cover is grasped with a clamp attached to the load cell of the Instron Tester. The average tension required to pull the rubber cover from the test cords in a one-inch wide ring is reported in pounds per inch of width and is averaged for at least four samples.

EXAMPLE 1

Polyethylene terephthalate having a solution IV of 0.88 was melt-spun through a 250-hole spinnerette at a rate of 380 grams per minute. Immediately after quenching and before convergence of the filaments, the open bundle of filaments was passed over a rotating finish roll ("kiss roll") wetted with a 40% solution of a mixture of aromatic isocyanates containing about 60% methylene-bis (4-phenylisocyanate), about 8% dimerized methylenebis(4-phenylisocyanate),and about 32% polymethylene polyphenyl isocyanate, in monochlorobenzene to give an isocyanate pick-up of 0.3% on weight of fiber. Immediately after the application of the isocyanate, a hydroxy-containing lubricating finish comprising a sulfonated fatty acid-ethylene oxide copolymer, hexadecyl stearate, oleic acid, and a bactericide was applied to the filaments from a 5% solution in a 3:1 mixture of water:acetone from a "shoe" applicator to give a finish pick-up of 0.1% on weight of fiber. The filaments were then wound up as undrawn yarn on tubes. These packages of yarn were then transferred to draw twister where the yarn was drawn to 5.2 times its undrawn length between heated godets across a heated platen to a twisted pirn. (The following conditions were maintained: Feed Rolls temperature 180° F., speed 60.6 meters per minute; Platen length 10–12 inches contact with yarn, temperature 385° F.; Draw Rolls unheated, speed 315 meters per minute.) Subsequently, the yarn was twisted and plied to a 1000/3 ply 10S × 10Z cord construction. After application of the RFL dip, drying at 400° F. for 90 seconds, and testing by the Ring Peel Adhesion test previously described, an adhesion value of 55 pounds per inch width was obtained.

EXAMPLE 2

Example 1 was repeated except that the finish was applied from a solution in a 9:1 mixture of water:isopropyl alcohol to give a finish pick-up of 0.39% on weight of fiber and the tube packages of yarn containing finish were stored prior to draw-twisting. The adhesion value declined with storage time as seen from the data in Table I.

TABLE I S

Table I

| Storage Time Before Drawing | < 1 hr. | 4 hrs. | 24 hrs. |
|---|---|---|---|
| Ring Peel Adhesion (16/inch) | 56.9 | 53.5 | 47.8 |

EXAMPLE 3

Polyethylene terephthalate having a solution IV of 0.88 was melt-spun through a 250-hole spinnerette at a rate of 380 grams per minute. Immediately after quenching and before convergence of the filaments, the open bundle of filaments was passed over a rotating finish roll ("kiss roll") wetted with a 40% solution of a mixture of aromatic isocyanates containing about 60% methylene-bis (4-phenylisocyanate), about 8% dimerized methylenebis (4-phenylisocyanate), and about 32% polymethylene polyphenyl isocyanate, in monochlorobenzene to give an isocyanate pick-up of 0.3% on weight of fiber. The filaments were then wound up as undrawn yarn on tubes. These tube packages of yarn were then transferred to a draw twister where a hydroxy-containing lubricating finish comprising a sulfonated fatty acid-ethylene oxide copolymer, hexadecyl stearate, oleic acid, and a bactericide was applied to the yarn from a 5% solution in a 3:1 mixture of water:acetone from a kiss-roll applicator to give a finish pick-up of 0.1% on weight of fiber, and, immediately thereafter (so that only about 0.05 second elapsed), the yarn was drawn to 5.2 times its undrawn length between heated godets across a heated platen to a twister pirn. (The following conditions were maintained: Feed Rolls temperature 180° F., speed 60.6 meters per minute; Platen length 10-12 inches contact with yarn, temperature 385° F.; Draw Rolls unheated, speed 315 meters per minute.) Subsequently, the yarn was twisted andd plied to a 1000/3 ply 10S × 10Z cord construction. After application of the RFL dip, drying at 400° F. for 90 seconds, and testing by the Ring Peel Adhesion test previously described, an adhesion value of 119.4 pounds per inch width was obtained.

EXAMPLES 4-8

Example 3 was repeated with variations in the finish application to give different finish pick-up levels. When the finish pick-up was less than 0.02% on weight of fiber, the yarn could not be drawn due to excessive broken filaments. The adhesion value declined with increasing finish pick-up as seen from the data in Table II.

Table II

| Ex. | Finish Solvent | Finish Pick-up (% on weight of fiber) | Ring Peel Adhesion (lb./inch width) |
| --- | --- | --- | --- |
| 4 | Stoddard Solvent | 0.05 | 99.0 |
| 5 | " | 0.09 | 89.1 |
| 6 | 3:1-water:Acetone | 0.19 | 83.0 |
| 7 | " | 0.19 | 88.5 |
| 8 | Water | 1.0 | 65.6 |

EXAMPLEES 9-22

Example 1 was repeated except that the finish was applied from a solution in a water-isopropyl alcohol mixture (Examples 9-17 )or a water-acetone mixture (Examples 18-22) to yield various finish pick-up levels. With finish levels greater than 0.4%, the ring peel adhesion values were unsatisfactory, as seen from the data in Table III.

Table III

| Example | Finish Pick-up (% on weight of fiber) | Ring Peel Adhesion (lb./inch width) |
| --- | --- | --- |
| 9 | 1.1 | 20.5 |
| 10 | 0.69 | 34.9 |
| 11 | 0.60 | 21.2 |
| 12 | 0.56 | 20.8 |
| 13 | 0.48 | 25.0 |
| 14 | 0.42 | 27.0 |
| 15 | 0.41 | 35.0 |
| 16 | 0.41 | 21.9 |
| 17 | 0.24 | 60.0 |
| 18 | 0.41 | 42.6 |
| 19 | 0.20 | 56.0 |
| 20 | 0.19 | 78.6 |
| 21 | 0.10 | 69.8 |
| 22 | 0.05 | 51.9 |

EXAMPLES 23-29

Example 1 was repeated except that the finish was applied from various solvents to give various finish pick-up levels. The results are reported in Table IV.

Table IV

| Example | Finish Solvent | Finish Pick-up (% on weight of fiber) | Ring Peel Adhesion (lb./inch width) |
| --- | --- | --- | --- |
| 23 | Acetone | 0.37 | 55.0 |
| 24 | Stoddard Solvent | 0.23 | 54.6 |
| 25 | Stoddard Solvent | 0.07 | 68.1 |
| 26 | Water | 0.30 | 73.2 |
| 27 | " | 0.11 | 63.6 |
| 28 | " | 0.12 | 74.0 |
| 29 | " | 0.10 | 76.4 |

1. In the process of dry heat drawing filaments of synthetic linear condensation polyester coated with an aromatic isocyanate containing at least two isocyanate groups per molecule to stretch such filaments to 4 to 7 times their undrawn length, the improvement comprising applying to the isocyanate-coated polyester filaments 0.02 to 0.4% on weight of fiber of a hydroxy-containing finish less than one hour prior to dry heat drawing said filaments by heating the filaments in air in contact with a heated surface 2. A process as defined in claim 1 wherein said finish comprises an ethylene oxide-fatty acid copolymer.

3. A process as defined in claim 1 wherein said finish is applied as a 5 to 20% solution.

4. A process as defined in claim 1 wherein said finish is applied less than one minute prior to drawing said filaments.

* * * * *